US008031599B2

(12) United States Patent
Duffield et al.

(10) Patent No.: US 8,031,599 B2
(45) Date of Patent: *Oct. 4, 2011

(54) STATISTICAL, SIGNATURE-BASED APPROACH TO IP TRAFFIC CLASSIFICATION

(75) Inventors: Nicholas G. Duffield, New York, NY (US); Matthew Roughan, Morristown, NJ (US); Subhabrata Sen, Chatham, NJ (US); Oliver Spatscheck, Randolph, NJ (US)

(73) Assignee: AT&T Intellectual Property II, LP

( * ) Notice: Subject to any disclaimer, the term of this patent is extended or adjusted under 35 U.S.C. 154(b) by 0 days.

This patent is subject to a terminal disclaimer.

(21) Appl. No.: 12/635,127

(22) Filed: Dec. 10, 2009

(65) Prior Publication Data

US 2010/0085889 A1 Apr. 8, 2010

Related U.S. Application Data

(63) Continuation of application No. 10/764,001, filed on Jan. 23, 2004, now Pat. No. 7,660,248.

(51) Int. Cl.
*H04L 12/28* (2006.01)

(52) U.S. Cl. ............... 370/230.1; 370/229; 370/232; 370/235; 370/238; 370/252

(58) Field of Classification Search ............ 370/229, 370/230, 230.1, 234, 235, 235.1, 237, 238, 370/241, 242, 244, 245, 250, 231, 232, 233, 370/252, 253
See application file for complete search history.

(56) References Cited

U.S. PATENT DOCUMENTS

| | | | | |
|---|---|---|---|---|
| 6,480,495 B1 * | 11/2002 | Mauger et al. | ........... | 370/395.65 |
| 7,076,547 B1 * | 7/2006 | Black | ........................ | 709/224 |
| 7,506,046 B2 * | 3/2009 | Rhodes | ........................ | 709/224 |
| 7,584,298 B2 * | 9/2009 | Klinker et al. | ............... | 709/238 |
| 7,774,440 B1 * | 8/2010 | Bagrodia et al. | ............. | 709/221 |
| 7,782,793 B2 * | 8/2010 | Olesinski et al. | ............ | 370/253 |
| 7,796,983 B2 * | 9/2010 | Pao et al. | ....................... | 455/423 |

OTHER PUBLICATIONS

Dewes, et al, An Analysis of Internet Chat Traffic, Oct. 2003, Proceedings of ACM SIGCOMM Internet Measurement Conference.

* cited by examiner

*Primary Examiner* — Hassan Phillips
*Assistant Examiner* — Mark A Mais

(57) ABSTRACT

A signature-based traffic classification method maps traffic into preselected classes of service (CoS). By analyzing a known corpus of data that clearly belongs to identified ones of the preselected classes of service, in a training session the method develops statistics about a chosen set of traffic features. In an analysis session, relative to traffic of the network where QoS treatments are desired (target network), the method obtains statistical information relative to the same chosen set of features for values of one or more predetermined traffic attributes that are associated with connections that are analyzed in the analysis session, yielding a statistical features signature of each of the values of the one or more attributes. A classification process then establishes a mapping between values of the one or more predetermined traffic attributes and the preselected classes of service, leading to the establishment of QoS treatment rules.

1 Claim, 1 Drawing Sheet

STATISTICAL, SIGNATURE-BASED APPROACH TO IP TRAFFIC CLASSIFICATION

BACKGROUND OF THE INVENTION

This application is a continuation application of U.S. patent application Ser. No. 10/764,001, now U.S. Pat. No. 7,660,248, deriving priority therefrom.

This invention relates to traffic classification and, more particularly to statistical classification of IP traffic.

The past few years have witnessed a dramatic increase in the number and variety of applications running over the Internet and over enterprise IP networks. The spectrum includes interactive (e.g., telnet, instant messaging, games, etc.), bulk data transfer (e.g., ftp, P2P file downloads), corporate; (e.g., Lotus Notes, database transactions), and real-time applications (voice, video streaming, etc.), to name just a few.

Network operators, particularly in enterprise networks, desire the ability to support different levels of Quality of Service (QoS) for different types of applications. This desire is driven by (i) the inherently different QoS requirements of different types of applications, e.g., low end-end delay for interactive applications, high throughput for file transfer applications etc.; (ii) the different relative importance of different applications to the enterprise—e.g., Oracle database transactions are considered critical and therefore high priority, while traffic associated with browsing external web sites is generally less important; and (iii) the desire to optimize the usage of their existing network infrastructures under finite capacity and cost constraints, while ensuring good performance for important applications.

Various approaches have been studied, and mechanisms developed for providing different QoS in a network. See, for example, S. Blake, et al., RFC 2475—an architecture for differentiated service, December 1998, URL of text: //ww-.faqs.org/rfcs/rfc2475.html; and C. Gbaguidi, et al., A survey of differentiated services architectures for the Internet, March 1998, URL of text: //sscwww.epfl.ch/Pages/publications/ps-_files/tr98_020.ps; and Y. Bernet, et al., A framework for differentiated services. Internet Draft (draft-ietf-diffserv-framework-02.txt), February 1999, URL of text: //search.ietf.org/internet-drafts/draft-ietf-diffserv-framework-02.txt.

Previous work also has examined the variation of flow characteristics according to applications. M. Allman, et al., TCP congestion control, IETF Network Working Group RFC 2581, 1999, investigated the joint distribution of flow duration and number of packets, and its variation with flow parameters such as inter-packet timeout. Differences were observed between the distributions of some application protocols, although overlap was clearly also present between some applications. Most notably, the distribution of DNS transactions had almost no overlap with that of other applications considered. However, the use of such distributions as a discriminator between different application types was not considered.

There also exists a wealth of research on characterizing and modeling workloads for particular applications, with A. Krishnamurth, et al., *Web Protocols and Practice*, Chapter 10, Web Workload Characterization, Addison-Wesley, 2001; and J. E. Pitkow, Summary of WWW characterizations, *W3J*, 2:3-13, 1999 being but two examples of such research.

An early work in this space, reported in V. Paxson, "Empirically derived analytic models of wide-area TCP connections," *IEEE/ACM Transactions on Networking*, vol. 2, no. 4, pp. 316-336, 1994, examines the distributions of flow bytes and packets for a number of different applications.

Interflow and intraflow statistics are another possible dimension along which application types may be distinguished and research has been conducted. V. Paxson, et al., "Wide-area traffic: The failure of Poisson modeling," *IEEE/ACM Transactions on Networking*, vol. 3, pp. 226-244, June 1995, for example, found that user initiated events—such as telnet packets within flows or FTP-data connection arrivals—can be described well by a Poisson process, whereas other connection arrivals deviate considerably from Poisson.

Signature-based detection techniques have also been explored in the context of network security, attack and anomaly detection; e.g. P. Barford et al., Characteristics of Network Traffic Flow Anomalies, *Proceedings of ACM SIGCOMM Internet Measurement Workshop*, October 2001; and P. Barford, et al., A Signal Analysis of Network Traffic Anomalies, *Proceedings of ACM SIGCOMM Internet Measurement Workshop*, November 2002, where one typically seeks to find a signature for an attack.

Actually, realization of a service differentiation capability requires (i) association of the traffic with the different applications, (ii) determination of the QoS to be provided to each, and finally, (iii) mechanisms in the underlying network for providing the QoS; i.e., for controlling the traffic to achieve a particular quality of service.

While some of the above-mentioned studies assume that one can identify the application traffic unambiguously and then obtain statistics for that application, none of them have considered the dual problem of inferring the application from the traffic statistics. This type of approach has been suggested in very limited contexts such as identifying chat traffic in C. Dewes, et al., An analysis of Internet chat systems, *Proceedings of ACM SIGCOMM Internet Measurement Conference*, October 2003.

Still, in spite of a clear perceived need, and the prior art work reported above, widespread adoption of QoS control of traffic has not come to pass. It is believed that the primary reason for the slow spread of QoS-use is the absence of suitable mapping techniques that can aid operators in classifying the network traffic mix among the different QoS classes. We refer to this as the Class of Service (CoS) mapping problem, and perceive that solving this would go a long way in making the use of QoS more accessible to operators.

SUMMARY

An advance in the art of providing specified QoS in an IP network is achieved with a signature-based traffic classification method that maps traffic into preselected classes of service (CoS). By analyzing, in a training session, a known corpus of data that clearly belongs to identified ones of the preselected classes of service, the method develops statistics about a chosen set of traffic features. In an analysis session, relative to traffic of the network where QoS treatments are desired (target network), obtaining statistical information relative to the same chosen set of features for values of one or more predetermined traffic attributes that are associated with connections that are analyzed in the analysis session, yielding a statistical features signature of each of the values of the one or more attributes. A classification process then establishes a mapping between values of the one or more predetermined traffic attributes and the preselected classes of service, leading to the establishment of rules. Once the rules are established, traffic that is associated with particular values of the predetermined traffic attributes are mapped to classes of service, which leads to a designation of QoS.

Illustratively, the preselected classes of service may be interactive traffic, bulk data transfer traffic, streaming traffic and transactional traffic. The chosen set of traffic features may be packet-level features, flow-level features, connection-level features, intra-flow/connection features, and multi-flow features. The predetermined traffic attributes may be the server port, and the server IP address. An illustrative rule might state that "a connection that specifies port x belongs to the class of interactive traffic." An administrator of the target network may choose to give the highest QoS level to such traffic.

DETAILED DESCRIPTION

Figure 1:
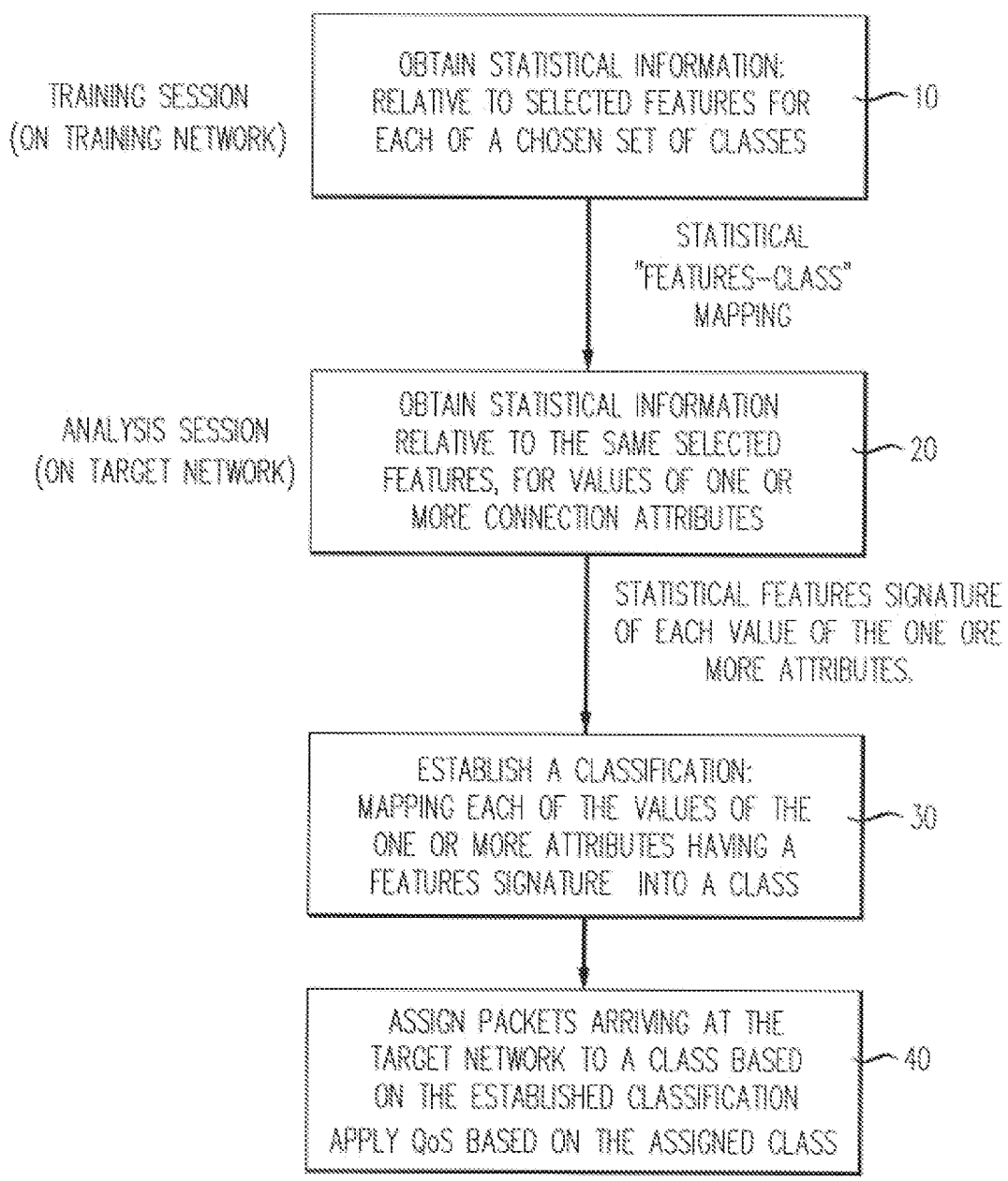
FIG. 1 presents a flow chart of the IP traffic classification method disclosed herein.

In accord with the principles disclosed herein QoS implementations are based on mapping of traffic into classes of service. In principle the division of traffic into CoS could be done by end-points of the network, where traffic actually originates—for instance by end-user applications. However, for reasons of trust and scalability of administration and management, it is typically more practical to perform the CoS mapping within the network; for instance, at the router that connects the Local Area Network (LAN) to the Wide Area Network (WAN). Alternatively, there might be appliances connected near the LAN to WAN transition point that can perform packet marking for QoS.

CoS mapping inside the network is a non-trivial task. Ideally, a network system administrator would possess precise information on the applications running inside the administrator's network, along with simple and unambiguous mappings, which information is based on easily obtained traffic measurements (e.g., by port numbers, or source and destination IP addresses). This information is vital not just for the implementation of CoS, but also in planning the capacity required for each class, and balancing tradeoffs between cost and performance that might occur in choosing class allocations. For instance, one might have an application whose inclusion in a higher priority class is desirable but not cost effective (based on traffic volumes and pricing), and so some difficult choices must be made. Good data is required for these to be informed choices.

In general, however, the required information is rarely up-to-date, or complete, if it is available at all. The traditional ad-hoc growth of IP networks, the continuing rapid proliferation of new applications, the merger of companies with different networks, and the relative ease with which almost any user can add a new application to the traffic mix with no centralized registration are all factors that contribute to this "knowledge gap". Furthermore, over recent years it has become harder to identify network applications within IP traffic. Traditional techniques such as port-based classification of applications, for example, have become much less accurate.

One approach that is commonly used for identifying applications on an IP network is to associate the observed traffic (using flow level data, or a packet sniffer) with an application based on TCP or UDP port numbers. Alas, this method is inadequate.

The TCP/UDP port numbers are divided into three ranges: the Well Known Ports (0-1023), the Registered Ports (1024-49,151), and the Dynamic and/or Private ports (49,152-65,535). A typical TCP connection starts with a SYN/SYN-ACK/ACK handshake from a client to a server. The client addresses its initial SYN packet to the well-known server port of a particular application. The client typically chooses the source port number of the packet dynamically. UDP uses ports similarly to TCP, though without connection semantics. All future packets of a session, in either a TCP or UDP session, use the same pair of ports to identify the client and server side of the session. Therefore, in principle, the TCP or UDP server port number can be used to identify the higher layer application by simply identifying in an incoming packet the server port and mapping this port to an application using the IRNA (Internet Assigned Numbers Authority) list of registered ports (: //www.iana.org/assignments/port-numbers). However, port-based application classification has limitations. First, the mapping from ports to applications is not always well defined. For instance.

Many implementations of TCP use client ports in the registered port range. This might mistakenly classify the connection as belonging to the application associated with this port. Similarly, some applications (e.g., old bind versions), use port numbers from the well-known ports to identify the client site of a session.

Ports are not defined with IRNA for all applications, e.g., P2P applications such as Napster and Kazaa.

An application may use ports other than its well-known ports to circumvent operating system access control restrictions. E.g., non-privileged users often run WWW servers on ports other than port 80, which is restricted to privileged users on most operating systems.

There are some ambiguities in the port registrations, e.g., port 888 is used for CDDBP (CD Database Protocol) and access-builder.

In some cases server ports are dynamically allocated as needed. For example, FTP allows the dynamic negotiation of the server port used for the data transfer. This server port is negotiated on an initial TCP connection, which is established using the well-known FTP control port.

The use of traffic control techniques like firewalls to block unauthorized, and/or unknown applications from using a network has spawned many work-arounds which make port based application authentication harder. For example, port 80 is being used by a variety of non-web applications to circumvent firewalls which do not filter port-80 traffic. In fact, available implementations of IP over HTTP allow the tunneling of all applications through TCP port 80.

Trojans and other security attacks generate a large volume of bogus traffic which should not be associated with the applications of the port numbers those attacks use.

A second limitation of port-number based classification is that a port can be used by a single application to transmit traffic with different QoS requirements. For example, (i) Lotus Notes transmits both email and database transaction traffic over the same ports, (ii) sep (secure copy), a file transfer protocol, runs over ssh (secure shell), an interactive application using default TCP port 22. This use of the same port for traffic requiring different QoS requirements is quite legitimate, and yet a good classification must separate different use cases for the same application. A clean QoS implementation is still possible through augmenting the classification rules to include IP address-based disambiguation. Server lists exist in some networks but, again, in practice these lists are often incomplete, or a single server could be used to support a variety of different types of traffic, so we must combine port and IP address rules.

A possible alternative to port based classification is to use a painstaking process involving installation of packet sniffers and parsing packets for application-level information to identify the application class of each individual TCP connection or UDP session. However, this approach cannot be used with more easily collected flow level data, and its collection is computationally expensive, limiting its application to lower bandwidth links. Also this approach requires precise prior knowledge of applications and their packet formats—something that may not always be possible. Furthermore, the introduction of payload encryption is increasingly limiting our ability to see inside packets for this type of information.

For the above reasons, a different approach is needed.

In accord with the principles disclosed herein CoS mapping is achieved using a statistical method. Advantageously, the disclosed method performs CoS mapping based on simply and easily determined attribute, or attributes of the traffic. Specifically, the disclosed method assigns traffic to classes based on selected attribute or attributes based on a mapping derived from a statistical analysis that forms a signature for traffic having particular values for those attributes.

Thus, in accord with the principles disclosed herein, a three-stage process is undertaken, as depicted in FIG. 1; to wit,
1. statistics collection—blocks 10 and 20,
2. classification and rule creation—block 30, and
3. application of rules to active traffic—block 40.

Block 10 obtains statistical information, in a training session, relative to selected features for each of a chosen set of classes by using training data that includes collections of traffic, where each collection clearly belongs to one of the chosen classes, and there is found a collection for each of the chosen set of classes. This may be termed statistical "features-class" mapping Specifically, first the classes of traffic are selected/identified to which administrators of networks may wish to apply different QoS treatment, and traffic from a network having a well-established set of applications that belong to the identified classes (training network) is employed to obtain a set of statistics for a chosen set of features. The notion here is that if it is concluded, from the data of the training network, that feature A of class x applications is characterized by a narrow range in the neighborhood of value Y, then, at a later time, if one encounters traffic in a target network where feature A has the value Y one may be able conclude with a high level of confidence that the traffic belongs to class x.

With respect to class definitions, it makes sense to limit the set of selected classes to those for which corporate network administrators might wish to employ for service differentiation. It is noted that today's corporate networks carry four broad application classes, which are described below, but it should be understood that additional, or other, classes can be selected. The four application classes are:

Interactive: The interactive class contains traffic that is required by a user to perform multiple real-time interactions with a remote system. This class includes such applications as remote login sessions or an interactive: Web interface.

Bulk data transfer: The bulk data transfer class contains traffic that is required to transfer large data volumes over the network without any real-time constraints. This class includes applications such as FTP, software updates, and music or video downloads.

Streaming: The streaming class contains multimedia traffic with real-time constraints. This class includes such applications as streaming and video conferencing.

Transactional: The transactional class contains traffic that is used in a small number of request response pairs that can be combined to represent a transaction. DNS, and Oracle transactions belong to this class.

In order to characterize each application class, it is clear that a reference data set is needed for each class. The problem is that one needs to identify the class before gathering the statistics for the chosen features can be extracted, but the features that ought to be chosen should be ones that characterize and disambiguate the classes. To break this circular dependency, in accord with the principles disclosed herein one or more specific "reference" applications are selected for each class that, based on their typical use, have a low likelihood of being contaminated by traffic belonging to another class. To select those applications, it makes sense to select applications that:

are clearly within one class (to avoid mixing the statistics from two classes);
are widely used, so as to assure we get a good data-set;
have server ports in the well-known port range to reduce the chance of mis-usage of these ports.

In a representative embodiment of the disclosed method, the reference applications selected for each application class are:

Interactive: Telnet,
Bulk data: FTP-data, Kazaa,
Streaming: RealMedia streaming,
Transactional: DNS, HTTPS.

As indicated above, the statistical information that is gathered for each class pertains to the chosen set of features. As for the features that one might consider, it is realized the list of possible features is very large, that the actual selection is left to the practitioner. However, it is beneficial to note that one can broadly classify those features into categories:

1. Simple packet-level features such as packet size and various moments thereof, such as variance, RMS (root mean square) of the size etc., are simple to compute, and can be gleaned directly from packet-level information. One advantage of such features is that they offer a characterization of the application that is independent of the notion of flows, connections or other higher-level aggregations. Another advantage of such features is that packet-level sampling is widely used in network data collection and has little impact on these statistics.

Another set of statistics that can be derived from simple packet data are time series, from which one can derive a number of statistics; for instance, statistics relating to correlations over time (e.g., parameters of long-range dependence such as the Hurst parameter). An example of this type of classification can be seen in Z. Liu, et al., Profile-based traffic characterization of commercial web sites, *Proceedings of the 18th International Teletraffic Congress* (ITC-18), volume 5a, pages 231-240, Berlin, Germany, 2003, where the authors use time-of-day traffic profiles to categorize web sites.

2. Flow-level statistics are summary statistics at the grain of network flows. A flow is defined to be a unidirectional sequence of packets that have some field values in common, typically, the 5-tuple (source IP, destination IP, source port, destination port, IP Protocol type). Example flow-level features include flow duration, data volume, number of packets, variance of these metrics etc. There are some more complex forms of information one can also glean from flows (or packet data) statistics; for instance, one may look at the proportion of internal versus external traffic within a category—external traffic (traffic to the Internet) may have a lower priority within a corporate setting. These statistics can be obtained using flow-level data collected at routers using, e.g., Cisco Net-Flow, described in White paper—netflow services and applications, URL of text: //www.cisco.com/warp/public/cc/pd/iosw/ioft/neflct/tech/napps_wp.htm. These do not require the more resource-intensive process of finer grain packet-level traces. A limitation is, that flow-collection may sometimes aggregate packets that belong to multiple application-level connections into a single flow, which would distort the flow-level features.

3. Connection-level statistics are required to trace some interesting behavior associated with connection oriented transport-level connections such as TCP connections. A typical TCP connection starts and ends with well-defined handshakes from a client to a server. The collection process needs to track the connection state in order to collect connection level statistics. In addition to the features mentioned for the flow-level, other features that are meaningful to compute at the TCP connection level are the amount of symmetry of a connection, advertised window sizes and throughput distribution. The connection-level data generally provides better quality data than the flow-level information, but requires additional overhead, and would also be impacted by sampling or asymmetric routing at the collection point.

4. Intra-flow/connection features are features that are based on the notion of a flow or TCP connection, but require statistics about the packets within each flow. A simple example is the statistics of the inter-arrival times between packets in flows. This requires data collected at a packet level, but then grouped into flows. The relative variance of these inter-arrival times may be used as a measure of the burstiness of a traffic stream. Intraflow/connection features include loss rates, latencies etc.

5. Multi-flow: Sometimes interesting characteristics can be captured only by considering statistic, across multiple flows/connections. For instance, many peer-to-peer applications achieve the download of a large file by bulk downloads of smaller chunks from multiple machines—the individual chunk downloads are typically performed close together in time. For some multimedia streaming protocols, the high volume data connection is accompanied by a concurrent, separate connection between the same set of end-systems, containing low volume, intermittent control data (e.g., RTSP; see H. Schulzrinne, et al., Real time streaming protocol (RTSP), request for comments 2326, April 1998, ftp://ftp.isi.edu/in-notes/rfc2326.txt). These multi flow features are more complex and computationally more expensive to capture than flow or connection data alone.

Turning attention to block 20 of FIG. 1, in accord with the principles disclosed herein statistical information is collected relative to traffic that is identified by one or more predetermined attributes. More specifically, block 20 obtains statistical information, in an analysis session that employs traffic of the target network, relative to the same selected features that were analyzed in block 10, for one or more predetermined attributes that are associated with connections that are analyzed in the analysis session. Block 20 yields a statistical features-signature of each of the analyzed values of the one or more predetermined attributes. That is, in connection with each value of any one of the predetermined attributes, statistical information is gathered regarding the aggregate traffic that is accumulated in the analysis session. For illustrative purposes, the traffic attributes that are considered herein are the server ports $P_i$ and the server IP address $I_i$. The traffic aggregates are the collections of traffic relative to a particular server port, or relative to a particular IP address.

Thus, in accord with the principles of this disclosure, a vector of statistics $S^C(i)$ is formed for each connection i, where the elements of the vector are the chosen features, and used to update the statistics of each aggregate in which connection i is involved, for instance statistics $S^C(p)$ for port aggregates, and $S^I(I_i)$ for server aggregates. To illustrate for statistics collected on TCP connections, the procedure might as in the following pseudocode.

```
foreach packet
    if (packet represents a new TCP connection)
        assign the connection index i++
        determine the aggregates for connection i
            server port P_i = dst port of SYN
            server IP address I_i = dst IP of SYN
            ...
        initialize a set of statistics S^C (i)
    elseif (packet belongs to an existing TCP connection i)
        update connection statistics S^C (i)
    elseif (packet represents end TCP connection i)
        update connection statistics S^C (i)
        update statistics for each aggregate
            by server port: S^C (P_i)
            by server IP address: S^I (I_i)
    endif
end foreach
```

The update procedure for connections depends on the statistic in question. Ideally, statistics should be chosen that can be updated on-line in a streaming fashion, i.e., recursively, because that would allow the method to not store data for each packet but, rather, per connection. For example it is desirable to employ an algorithm like $$S_k^C(i) \leftarrow f(X_j^i(k), S_k^C, \phi(i)), \quad (1)$$

where $X_j^i(k)$ is the measurements for packet j, relative to statistic (feature) k, in connection i, $S_k^C(i)$ is the $k^{th}$ statistic (feature) for connection i, and $\phi(i)$ is some (small) set of state information (e.g., the packet number j) for connection i. With an update algorithm as specified by equation (1), the memory required to store the state depends on the number of connections. The following gives a number of specific examples that comport with equation (1):

1. Average:

$$\overline{X}_{j+1} = \frac{1}{j+1} X_{j+1} + \frac{j}{j+1} \overline{X}_j, \quad (2)$$

2. Variance:

$$\mathrm{var}(X_{j+1}) = \frac{1}{j} X_{j+1} + \frac{j-1}{j} \mathrm{var}(X_j) + \frac{j}{j-1} \overline{X}_j^2 - \frac{j-1}{j} \overline{X}_{j+1}^2, \quad (3)$$

where $\overline{X}_j$ and $\mathrm{var}(X_j)$ are the mean and variance, respectively, of the first j samples (e.g., packets) of data. However, even for more difficult statistics, such as quantiles, there are a number of approximation algorithms that can be used to approximate the statistic on-line. See A. C. Gilbert, et al., "Fast, small-space algorithms from approximate histogram maintenance." STOC, 2002. Equations (2) and (3) use "X" without the index that designates the feature that is being measured, for sake of clarity of the equations, but that is implied. That is, variables X could represent packet size, or inter-arrival time, or other features.

It is noted that some statistics need only be computed at the start and end of the TCP connection—for instance, the connection's duration, which may be computed by including the start time of the connection in the state variable $\phi(i)$.

Likewise, it is appealing to be able to update the statistics of each aggregate recursively, but this is not necessary, as it is much easier to store one set of statistics per connection than per packet. If the statistics for each connection are stored, then one could alternatively compute the statistics per aggregate off-line, after the data collection.

It may be noted that the analysis interval of block 20 may be finite, with a preselected duration. In such a caste, both at the beginning of the interval and at the end of the interval there is an issue associated with existing connections. With respect to the extant TCP connections at the end of data collection interval, for example, one can handle the connections in one of two ways: by including them in the statistics, or excluding them. Either approach biases the results in that if the connections are excluded, any connections that are longer than the aforementioned interval are not considered; but if the extant connections are included their duration is necessarily underestimated. These edge effects are minimized, of course, by employing a long data collection interval, for example a day, or longer. One might consider using the same interval for the analysis interval of block 20 as is used for the training interval of block 10, so that both data sets are subject to the same biases.

At the conclusion of the block 20 process, one has a collection of statistics indexed by values of the one or more predetermined attributes (in the illustrative example used herein, server port, and server IP address). The next step, in block 30, is to classify the traffic on each aggregate. More specifically, block 30 establishes a classification for each of the one or more attributes having a features signature into a class from the preselected set of classes, based on the statistical information of the features signature of block 20 and the statistical "features-class" mapping of block 10. Such classification can be done by any of a number of known algorithms. By way of example, the following describes two simple, but common, methods for classification: Nearest Neighbor (NN) and Linear Discriminant Analysis (LDA).

The general problem of classification can be characterized by the following: Given K classes, M features, and N training data points, the need is to determine a set of general rules for classifying feature data on the basis of a feature vector.

Each data point consists of the pair $X_j \in \mathbb{R}^M, G_j \in \{1, \ldots, K\}$, where j is the index that identifies the data point, $X_j$ is the M-dimensional feature vector (M features), and $G_j$ is the class of the jth data point. A rule needs to be established that would provide a mapping $\hat{G}_j: \mathbb{R}^M \to \{1, \ldots, K\}$ which states that, given a data point identified by j that possesses features as specified by the vector $X_j$, the rule should classify the data point j as belonging to class, $\hat{G}$.

One very simple method of classification is the "Nearest Neighbor" (NN) classification. In this classification method a data point is assigned to the class of its nearest (e.g., in the Euclidean distance sense) neighbor from the training data. That is, the class to which data point $X_j$, is assigned is the class $\hat{G}$ to which its nearest neighbor, X belongs; i.e., the neighbor X with the minimum $\|X-X_j\|$. To enhance its robustness, NN methods can be generalized to k-NN (where the k nearest neighbors essentially 'vote' on the class of the observation). k-NN methods are generally very good on low-dimensional data (small M), but are less effective on high-dimensional data, and give little insight into the most useful features.

An alternative set of approaches can be drawn from statistical decision theory, in which one may choose $\hat{G}(X)=G_i$ if $$Pr(G_i|x=X) = \max_{g \in \{1,\ldots,K\}} (\delta_g) \quad (4)$$

$$Pr(G_i|x=X) = \max_{g \in \{1,\ldots,K\}} Pr(g|x=X)$$

where $\delta_g = Pr(g|x=X)$, is generally called a discriminant function. Equation (4) basically chooses the class with maximal conditional probability, given the feature vector X. This approach is known as the Bayes classifier. It is noted that a k-NN approach can be seen as an approximation to the Bayes classifier above, where the probabilities $Pr(g|x=X)$ are approximated by the proportion of the k nearest neighbors of class g.

There are many alternative approaches for estimating the discriminant functions. LDA, described in T. Hastie, et al., *The Elements of Statistical Learning: Data Mining, Inference and Prediction*. Springer, 2001, is a simple method that can be derived via a number of approaches, a simple method being to assume that each class g has a Gaussian distribution with mean $\mu_g$ and with the same intra-class covariance $\Sigma$ for each class. This results in the linear discriminant functions $$\delta_g(x) = x^T \Sigma^{-1} \mu_g - \frac{1}{2} \mu_k^T \Sigma^{-1} \mu_g + \log \pi_g \quad (5)$$

where the prior probabilities $\pi_g$ of each class g are estimated using $\pi_g = N_g/N$ ($N_g$ being the number of training data points in class g), and the means and the covariance are estimated using standard estimators. LDA is so named because the decision boundaries thus formed are linear. This method can be generalized in a number of ways, for instance by assuming that the covariance of each class is different—an approach that generates Quadratic Discriminant Analysis (QDA), so called because the decision boundaries are now quadratic curves. Alternatively, one may perform LDA on a set of quadratic features. That is, rather than only using features (A, B), one uses the features (A, B, $A^1$, $B^2$, AB). This generates results similar to QDA.

Typically, one estimates the priors $\pi_g$ as above, but if the relative proportions of applications in the test network and target network may differ, then it may be more appropriate to use equal prior probabilities.

There are countless generalizations, and alternatives to the methods presented here, from the literature on classification, pattern recognition, and machine learning. The above approaches are merely representative of a wide variety of possibilities.

Once block 30 establishes the classifications, which effectively are the rules, such as traffic with attribute $A_i$ belongs to class $C_i$, it is a simple matter for an administrator of the target network to provide the desired QoS differentiation. If, for example, a particular server port $P_i$ has been classified to generate traffic that belongs to class $C_j$, all that the traffic administrator needs to determines is the QoS treatment rule, which may be:

Apply QoS treatment $Q_k$ for traffic to/from port $P_i$.

Obviously, one can create a large set of such rules, and in general it might be non-trivial to reduce the size of the rule set to a manageable size. In practice, however, the relatively small number of different QoS treatments that administrators are likely to wish to apply results in a need for only few rules.

Once a set of rules has been created, control passes in FIG. 1 to block 10 where the rules are installed and applied to active traffic. The rules may be installed in, for example, the access routers of the target network, which would use them to place packets in appropriate queues for forwarding.

It may be noted that once monitors are installed in the target network, there is no reason one could not use them in an on-going manner. One could continue to make the analysis process of block 20, and if something changes significantly, then one could change the rules used. An example might be the introduction of a new application with different QoS characteristics, requiring a rule update. It is not, however, envisioned that these updates would occur often.

It is realized that even though traffic in a target network A from IP address $I_i$ that employs port $P_j$ had in the past offered traffic that consistently exhibited the features corresponding to class x, and therefore a rule was created which stated that traffic from address $I_i$ and port $P_j$ belongs to class x, it does not mean such is, if fact, the case. However, analysis performed on real data gives strong support that the error rate of such an approach is quite low.

The invention claimed is:

1. A method for assigning packets belonging to traffic of a network to one of preselected classes of service, comprising the steps of
   in a training session
      observing values of preselected traffic attributes of traffic data flows in a preselected corpus of traffic data of said network that are known to belong to specific ones of said classes of service;
      performing statistical analysis of the observed preselected traffic attributes of traffic data flows, relative to said known classes of service, and
      creating a set of rules, based on said statistical analysis, that enable mapping a given traffic flow to one of said specific classes of service based on values of said preselected traffic attributes in said given traffic flow;
   following said training session
      receiving a packet that belongs to a flow of a connection, and
      assigning the packet to one of said classes of service, in accordance with said set of rules, based on one or more of said preselected traffic attributes that pertain to said packet where said step of performing statistical analysis, comprises forming a vector of statistics, $S^c(i)$, is formed for each connection i, where the elements of the vector are said preselected traffic features, and executing the following pseudocode:

```
foreach packet
   if (packet represents a new TCP connection)
      assign the connection index i++
      determine the aggregates for connection i
         server port P_j = dst port of SYN
         server IP address I_i = dst IP of SYN
      initializevector S^C (i)
   elseif (packet belongs to an existing TCP connection i)
      update vector S^C (i)
   elseif (packet represents end TCP connection i)
      update vector S^C (i)
      update statistics for each aggregate
         by server port: S^C (P_j)
         by server IP address: S^I (I_i)
   endif.
```

* * * * *